United States Patent
Hart et al.

(10) Patent No.: US 7,657,664 B2
(45) Date of Patent: Feb. 2, 2010

(54) METHOD AND SYSTEM FOR TRACKING DEVICE DRIVER REQUESTS

(75) Inventors: Brian W. Hart, Austin, TX (US); Anil Kalavakolanu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 11/683,527

(22) Filed: Mar. 8, 2007

(65) Prior Publication Data

US 2008/0222321 A1 Sep. 11, 2008

(51) Int. Cl.
G06F 3/00 (2006.01)
G06F 13/00 (2006.01)
(52) U.S. Cl. ............................................. 710/5; 710/33
(58) Field of Classification Search ....................... 710/5
See application file for complete search history.

(56) References Cited

U.S. PATENT DOCUMENTS

| | | | |
|---|---|---|---|
| 5,388,254 A | | 2/1995 | Betz et al. |
| 5,606,559 A | * | 2/1997 | Badger et al. ............ 370/395.7 |
| 6,360,220 B1 | * | 3/2002 | Forin ............................. 707/8 |
| 7,076,573 B2 | * | 7/2006 | Allen et al. ................... 710/17 |
| 7,260,703 B1 | * | 8/2007 | Moore et al. ................ 711/203 |
| 2005/0076154 A1 | | 4/2005 | Chambliss et al. |

* cited by examiner

Primary Examiner—Alford W Kindred
Assistant Examiner—Zachary K Huson
(74) Attorney, Agent, or Firm—Mitch Harris, Atty at Law, LLC; Andrew M. Harris; Matthew W. Baca (57) ABSTRACT

A computer implemented method, an apparatus, and a computer usable program product for tracking device driver requests in a data processing system is provided. A controller receives a request from a device driver. The controller associates a timestamp and at least one pointer to the request, wherein the timestamp indicates a time the request is received by an operating system. The controller then links the request from the device driver in a queue in the operating system, wherein the pointer identifies the location of the request in the queue.

20 Claims, 5 Drawing Sheets

METHOD AND SYSTEM FOR TRACKING DEVICE DRIVER REQUESTS

BACKGROUND OF THE INVENTION

1. Field of the Invention

The present invention relates generally to an improved data processing system, and specifically to a data processing system for managing device driver requests. Still more specifically, the present invention relates to a computer implemented method, an apparatus, and a computer usable program product for timing and tracking device driver requests.

2. Description of the Related Art

Device drivers track and manage requests independently of one another and in different ways. Typically, all device drivers assign a timestamp to each request. However, the time or the part of the process in which the device driver timestamp is assigned varies from driver to driver. For example, one device driver may assign a device driver timestamp as the number of ticks since the computer system was booted. Another device driver may assign a device driver timestamp as the number of seconds since a particular date. Another device driver may leave the device driver timestamp field blank altogether. As a result, difficulty arises when an error is detected in a computer system, and the need to identify where the error occurred in the process is important. The inconsistent device driver timestamps make the identification of the error difficult because of the difficulty in pinpointing the exact request which was being processed when the error arose.

SUMMARY OF THE INVENTION

A computer implemented method, an apparatus, and a computer usable program product for tracking device driver requests in a data processing system is provided. A controller receives a request from a device driver. The controller associates a timestamp and at least one pointer to the request, wherein the timestamp indicates a time the request is received by an operating system. The controller then links the request from the device driver in a queue in the operating system, wherein the pointer identifies the location of the request in the queue.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
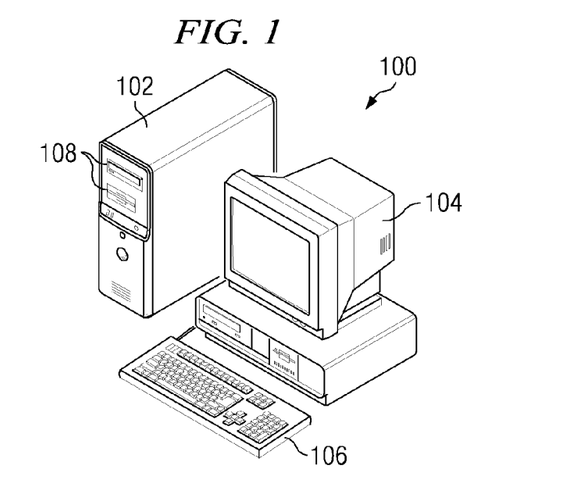
FIG. 1 is a pictorial representation of a data processing system, in which illustrative embodiments may be implemented.

With reference now to the figures and in particular with reference to FIG. 1, a pictorial representation of a data processing system is shown in which illustrative embodiments may be implemented. Server 100 includes system unit 102, video display terminal 104, keyboard 106, and storage devices 108, which may include floppy drives and other types of permanent and removable storage media. Additional input devices may be included with server 100. Examples of additional input devices could include, for example, a mouse, a joystick, a touchpad, a touch screen, a trackball, and a microphone.

Server 100 may be any suitable server, such as an IBM® eServer™ computer, which is a product of International Business Machines Corporation, located in Armonk, N.Y. Although the depicted representation shows a server, other embodiments may be implemented in other types of data processing systems. For example, other embodiments may be a personal computer or a data processing system implemented in a network server system. Server 100 also includes a graphical user interface (GUI) that may be implemented by means of systems software residing in computer readable media in operation within server 100.

Figure 2:
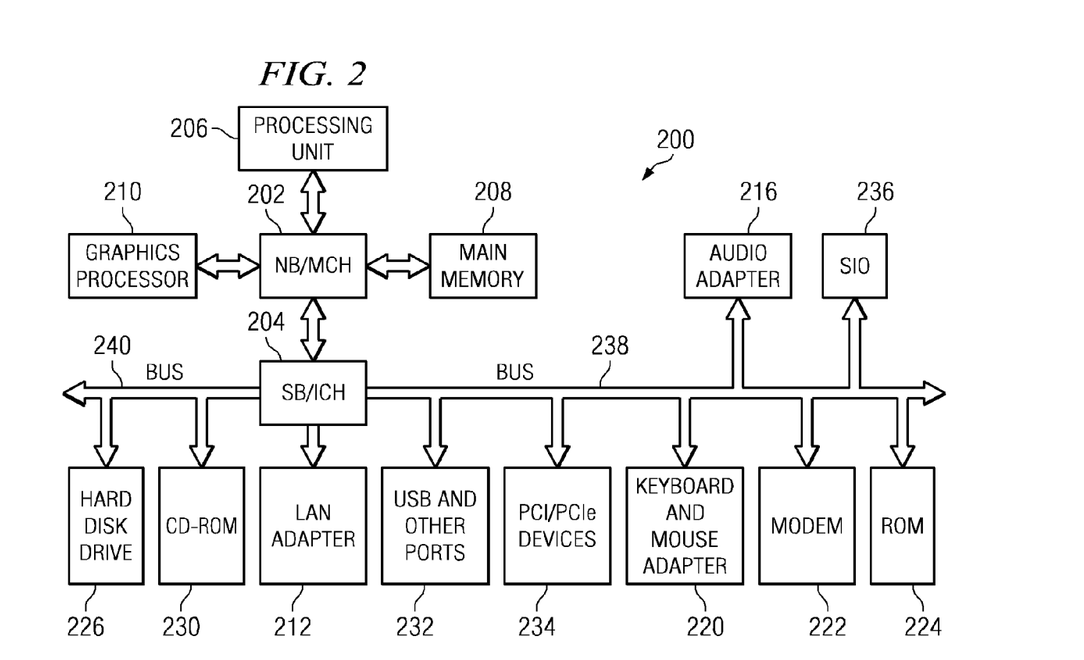
FIG. 2 depicts a block diagram of a data processing system, in which illustrative embodiments may be implemented.

Next, FIG. 2 depicts a block diagram of a data processing system in which illustrative embodiments may be implemented. Data processing system 200 is an example of a server, such as server 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub (SB/MCH) 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory (ROM) 224, or in one or more peripheral devices.

The hardware shown in FIGS. 1 and 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIGS. 1 and 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, a laptop computer, or a telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the communications fabric or architecture. Additionally, a communications unit may include one or more devices used to transmit and receive data, such as a modem or a network adapter. Further, a memory may be, for example, main memory 208 or a cache such as found in north bridge and memory controller hub (NB/MCH) 202. Also, a processing unit may include one or more processors or CPUs.

The depicted examples in FIGS. 1 and 2 are not meant to imply architectural limitations to the illustrative embodiments. In addition, the illustrative embodiments provide for a computer implemented method, an apparatus, and a computer usable program code for compiling source code and for executing code. The methods described with respect to the depicted illustrative embodiments may be performed in a data processing system, such as data processing system 100 shown in FIG. 1 or data processing system 200 shown in FIG. 2.

The illustrative embodiments provide a computer implemented method, an apparatus, and a computer usable program product for tracking device driver requests in a data processing system. A controller receives a request from a device driver. The controller then associates a timestamp and at least one pointer to the request. To associate means to append or link a timestamp or at least one pointer to the request. The timestamp indicates the time the request is received by an operating system. In one embodiment, the operating system includes a kernel. The kernel of an operating system is the core component of an operating system and manages all resources and communications between hardware and software components within the data processing system The controller then links the request from the device driver in a queue in the operating system. The queue can be a linked list, an associative array, a hash chain, or a mesh network. The pointer attaches the request to the queue by identifying at least one neighboring request in the queue. The controller then deletes the request from the queue when the request is finished processing.

In an alternative embodiment, the timestamp can be a first operating system timestamp. The controller can associate a second operating system timestamp to the request. The second operating system timestamp indicates a time when the request finishes processing. The controller can then determine a time duration between the first operating system timestamp and the second operating system timestamp. The time duration is the difference in the process times of the first and second operating system timestamps. If the time duration exceeds a threshold, the controller can optionally notify the data processing system, the user of the data processing system, or the administrator of the data processing system to investigate further.

Figure 3:
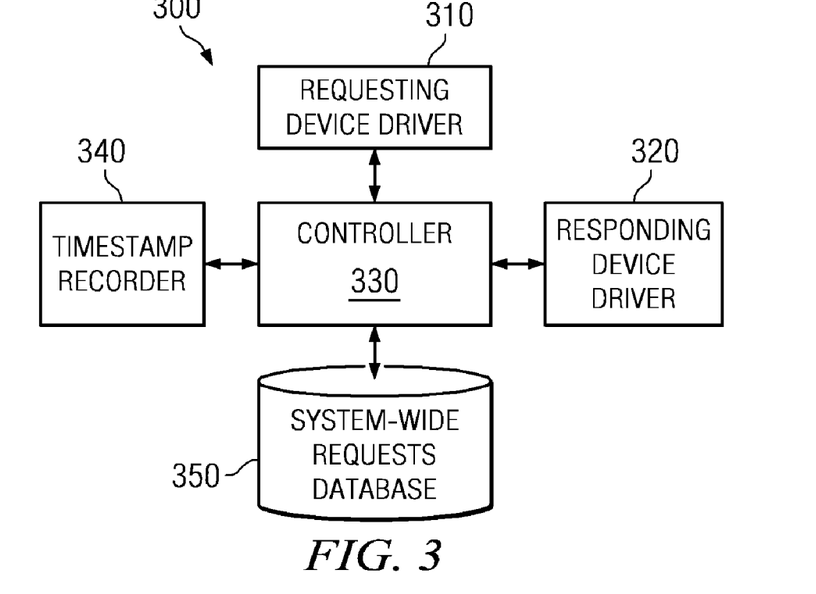
FIG. 3 illustrates a data processing system for managing device driver requests, in accordance with an illustrative embodiment.

FIG. 3 illustrates a data processing system for managing device driver requests, in accordance with an illustrative embodiment. Data processing system 300 can be executed as server 100 of FIG. 1 or data processing system 200 of FIG. 2. Data processing system 300 includes requesting device driver 310, responding device driver 320, controller 330, timestamp recorder 340, and system-wide requests database 350. All components in data processing system 300 are both hardware and software embodiments. However, in alternative embodiments, the components can be an entirely hardware embodiment or an entirely software embodiment.

Requesting device driver 310 and responding device driver 320 are a set of instructions or components which provide an interface between the operating system of data processing system 300 and a particular device. The device can be any number of hardware, logical, or virtual devices, including but not limited to a hard disk drive, a CD-ROM drive, a printer, a mouse, a keyboard, or software. In the illustrative embodiment, the device for requesting device driver 310 is a hard disk drive, and the device for responding device driver 320 is a CD-ROM drive.

Requesting device driver 310 and responding device driver 320 can be executed in the processing unit of data processing system 300, similar to processing unit 206 of FIG. 2. Specifically, in the illustrative embodiment, requesting device driver 310 and responding device driver 320 operate in the kernel of the operating system within data processing system 300. The kernel of an operating system is the core component of an operating system and manages all resources and communications between hardware and software components within data processing system 300. The illustrative embodiment is not limited to a specific operating system. In the illustrative embodiment, the operating system is an Advanced Interactive execution (AIX®) operating system. AIX® is a registered trademark of International Business Machines (IBM) Corporation in the United States, other countries, or both.

Controller 330 connects to requesting device driver 310, responding device driver 320, timestamp recorder 340, and system-wide requests database 350. Controller 330 manages the requests made by requesting device driver 310 and responding device driver 320. Controller 330 can be implemented in the processing unit of data processing system 300, similar to processing unit 206 of FIG. 2. Specifically, like requesting device driver 310 and responding device driver 320 in the illustrative embodiment, controller 330 can be implemented in the kernel of the operating system. More specifically, in the illustrative embodiment, controller 330 operates in an AIX® operating system and therefore manages the requests made by requesting device driver 310 and responding device driver 320 using the devstrat( ) and iodone( ) functions of the kernel. In alternative embodiments, controller 330 manages requests using similar functions or mechanisms depending on the type of operating system being used.

In use, controller 330 receives and transmits requests between requesting device driver 310 and responding device driver 320. When controller 330 receives a request from either requesting device driver 310 or responding device driver 320, controller 330 associates an operating system timestamp to each request. To associate can mean either to append or to link the operating system timestamp to the request. By having controller 330 manage when the operating system timestamp is associated, the operating system timestamp is associated at the same time for each request, and therefore not dependent on the timestamp individually applied by requesting device driver 310 and responding device driver 320. Furthermore, controller 330 also ensures that all operating system timestamps are measured and presented in a consistent format. As a result, a consistent operating system timestamp facilitates a more efficient and useful post-mortem trouble-shooting analysis of data processing system 300. Additionally, the consistent operating system timestamp provides a record of request durations, which can be used to improve future processing request times and usage requirements.

The operating system timestamp is generated by timestamp recorder 340, and the time on the operating system timestamp reflects the time in which controller 330 receives the request from either requesting device driver 310 or responding device driver 320. In alternative embodiments, the operating system timestamp can reflect the time in which controller 330 begins processing the request, the time in which controller 330 finishes processing the request, or any time in between as long as the operating system timestamp is taken at a consistent time in the process.

Timestamp recorder 340 is a device which reads and records the time of data processing system 300 and all requests processed by data processing system 300. The operating system timestamp generated by timestamp recorder 340 can be in a 12-hour or 24-hour format, and can include the hour, minute, second, tenth of a second, hundredth of a second, or any combination thereof. In an alternative embodiment, the operating system timestamp can also just be the elapsed time from a particular date and time, the number of ticks since data processing system 300 booted, or any other similar format. The format of the operating system timestamp can be determined by an administrator or user of data processing system 300, can be a default value, or empirically determined. Timestamp recorder 340 can be implemented in the processor unit of data processing system 300.

After controller 330 receives the request, controller 330 links the request to a queue stored in system-wide requests database 350. In an alternative embodiment, instead of linking the request to a queue, controller 330 can copy the request and place the request in the queue. System-wide requests database 350 is a storage element that stores all the requests and the location of the requests within data processing system 300. System-wide requests database 350 can be implemented in the main memory, similar to main memory 208 of FIG. 2, or the hard disk drive, similar to hard disk drive 226 of FIG. 2. System-wide requests database 350 can store data in any format, including, but not limited to a table, a flat file, an Extensible Markup Language (XML) file, a relational database management system, or any combination thereof.

In the illustrative embodiment, system-wide requests database 350 is a linked list of requests constructed using the pointers within each of the requests. A linked list is a data structure that includes a sequence of nodes. Each node includes a pointer or link to another node in the list. In some circumstances, the pointer can point to another linked list. Nodes can be inserted and deleted from any part of the linked list at any time.

In the illustrative embodiment, each request generated by requesting device driver 310 or responding device driver 320 includes a pointer. The pointer is used to link or attach the request to another request in the linked list. In the illustrative embodiment, the pointer in the request identifies the request to which the request is directly connected. In other words, the pointer identifies the request that is before the present request in the linked list order.

System-wide requests database 350 includes a linked list of all requests being processed within data processing system 300. Thus, system-wide requests database 350 can include other requests in addition to the requests made by requesting device driver 310 and responding device driver 320. In the illustrative embodiment, each new request from requesting device driver 310 and responding device driver 320 is added to the end of the queue or linked list. The request is removed from the queue when the request is finished processed. Thus, in the illustrative embodiment, the linked list maintains a list of all the active requests, or all the incomplete requests that are currently being processed. In a post-mortem trouble-shooting session, the linked list can be used to monitor long-running requests or track duration and efficiency of processing each request. Furthermore, the linked list can be used to identify the long-running requests at run-time.

The illustrative embodiment is not limited to the illustrated example. For example, data processing system 300 and system-wide requests database 350 can include more or fewer components. Additionally, system-wide requests database 350 can link requests in any other data format, including, but not limited to an associative array, a hash chain, or a mesh network. Furthermore, in an alternative embodiment, the pointers within each request may be absent from the request itself and stored in a separate component outside of the request. Moreover, timestamp recorder 340 can also be included within controller 330.

Figure 4:
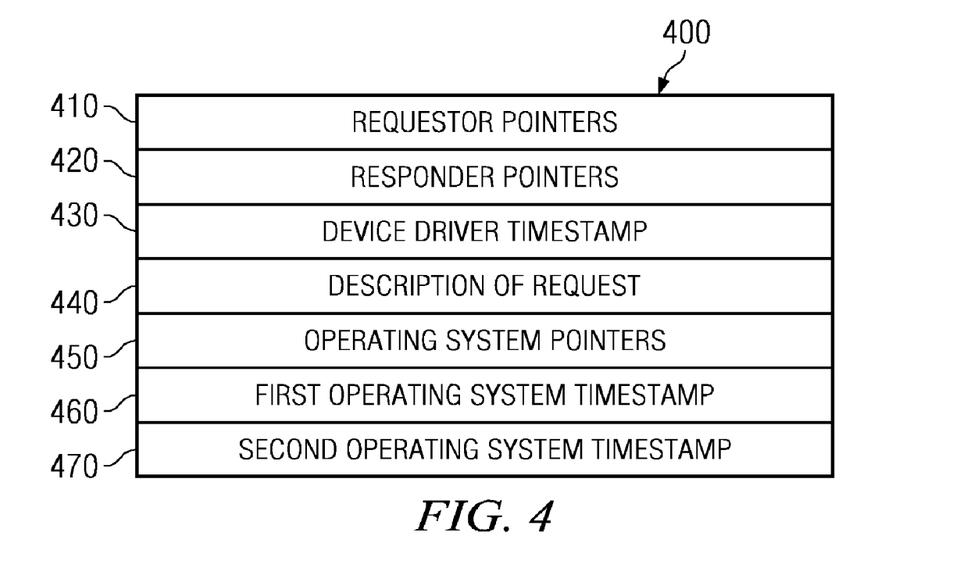
FIG. 4 illustrates a device driver request, in accordance with an illustrative embodiment.

FIG. 4 illustrates a device driver request, in accordance with an illustrative embodiment. Device driver request 400 can be generated by any device driver, such as requesting device driver 310 or responding device driver 320 of FIG. 3. Device driver request 400 includes requester pointers 410, responder pointers 420, device driver timestamp 430, description of request 440, operating system pointers 450, first operating system timestamp 460, and second operating system timestamp 470.

Requestor pointers 410 are the pointers managed by the requesting device driver, such as requesting device driver 310 of FIG. 3. The requesting device driver determines which data structure to link device driver request 400 to in requester pointers 410. The data structure can be a structure internal or external to the requesting device driver. Likewise, responder pointers 420 are the pointers managed by the responding device driver, such as responding device driver 320 of FIG. 3.

The responding device driver, like the requesting device driver, determines what data structure, internally or externally, to link device driver request 400. Requestor pointers 410 and responder pointers 420 provide a mechanism for the requesting device driver and the responding device driver, respectively, to track device driver request 400 as device driver request 400 is processing.

Device driver timestamp 430 is the default timestamp associated with the requesting device driver. Depending on the requesting device driver, device driver timestamp 430 can be any time in which the requesting device driver assigns to device driver request 400, such as the number of seconds since a particular date, the number of ticks since the data processing system booted, or the time in which the requesting device driver formed device driver request 400. Optionally, the requesting device driver can also leave device driver timestamp 430 empty and not include a time at all in request 400.

Description of request 440 describes the request that the requesting device driver is making of the responding device driver. In other words, description of request 440 is a set of instructions from the requesting device driver for the responding device driver. Description of request 440 can be any type of instruction, including, but not limited to, a request to read or obtain data from a particular memory in the requesting device driver. One of ordinary skill in the art will recognize the types of instructions that may be included in this request that would not deviate from the scope of the illustrative embodiments.

Operating system pointers 450 links device driver request 400 to a system-wide queue or linked list, similar to the linked list in system-wide requests database 350 of FIG. 3. Specifically, in the illustrative embodiment, operating system pointers 450 attaches device driver request 400 to another request in the queue by listing the memory address of the previous and subsequent requests in the queue. Alternatively, operating system pointers 450 can also include other information, such as additional memory addresses of other requests in the queue or other memory location identification information.

First operating system timestamp 460 is the time for which the controller, such as controller 330 of FIG. 3, receives device driver request 400. The controller associates first operating system timestamp 460 with device driver request 400, and the associated operating system timestamp is generated by a timestamp recorder, similar to timestamp recorder 340 of FIG. 3. In one embodiment, first operating system timestamp 460 is appended directly to device driver request 400. In another embodiment, first operating system timestamp 460 is a link to another memory element or tracking device that identifies a particular time for device driver request 400.

Additionally, in another embodiment, the controller can associate second operating system timestamp 470 with device driver request 400. Second operating system timestamp 470 can represent any time that may need to be used in a post-mortem analysis. For example, second operating system timestamp 470 can be time in which the data processing system finishes processing device driver request 400. The difference in time between first operating system timestamp 460 and second operating system timestamp 470 form a time duration. The controller can compare the time duration against a predetermined threshold time. The threshold time can indicate the existence of an error in processing device driver request 400. The threshold time can be any time period ranging between a few milliseconds and several days. The threshold time can be a default setting, determined by the administrator of a data processing system, established by a user, or empirically determined. If the threshold time is exceeded, the controller can notify the data processing system, the user of the data processing system, or the administrator of the data processing system to investigate further, or in the alternative, take appropriate preventative measures. In the illustrative embodiment, the threshold time is a default setting and is set to thirty seconds.

The illustrative embodiment is not limited to the illustrated example. For example, device driver request 400 can include more or fewer components. Additionally, each component in device driver request 400 can be represented in a different format and order than illustrated. Moreover, in an alternative embodiment, second operating system timestamp 470 can be absent from device driver request 400.

Figure 5:
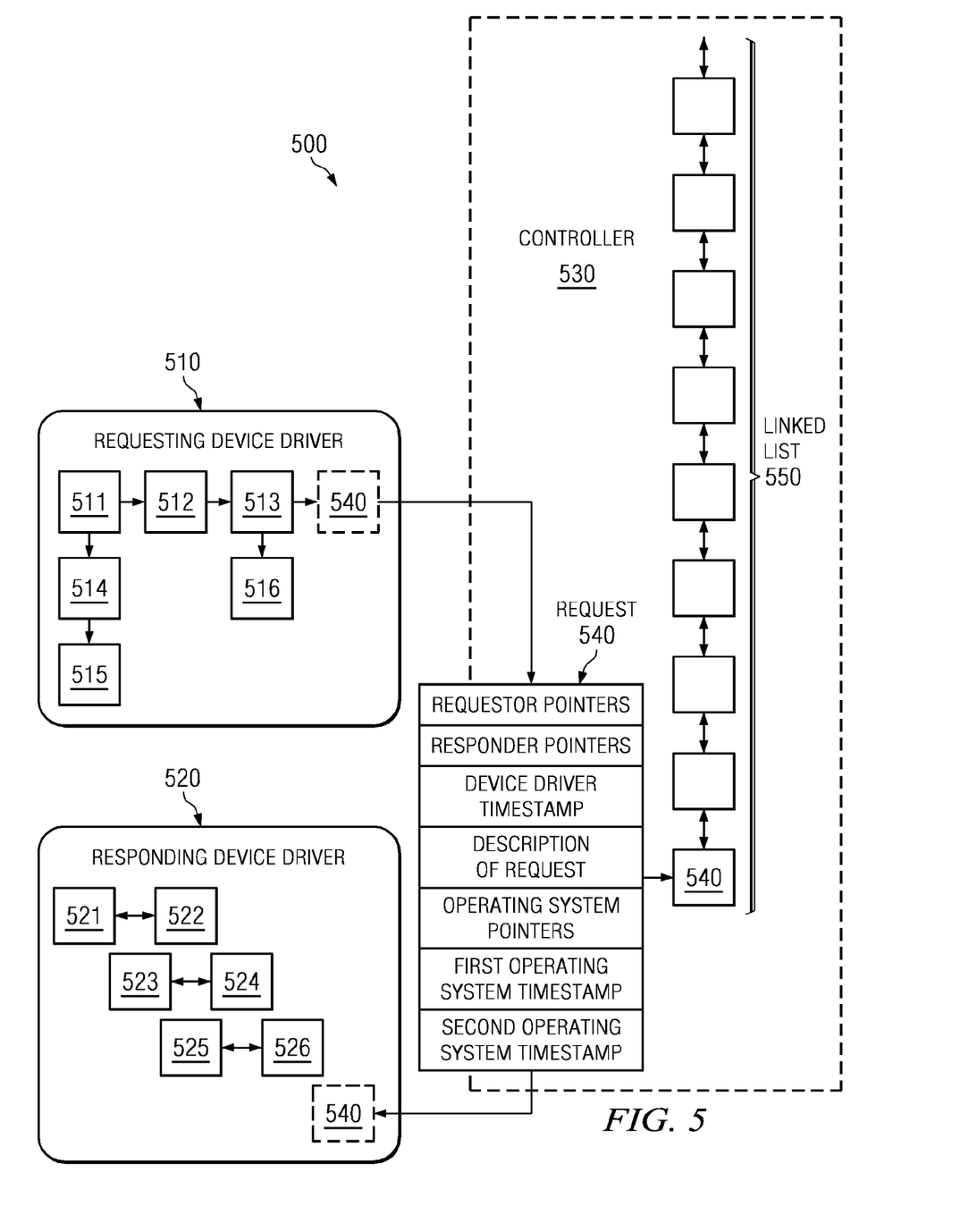
FIG. 5 illustrates the linking of a device driver request to a queue in an operating system, in accordance with an illustrative embodiment.

FIG. 5 illustrates the linking of a device driver request to a queue in an operating system, in accordance with an illustrative embodiment. Data processing system 500 is similar to data processing system 300 of FIG. 3. Data processing system 500 includes requesting device driver 510, responding device driver 520, controller 530, device driver request 540, and linked list 550.

In the illustrative embodiment, requesting device driver 510 is passing a request to responding device driver 520 via controller 530. Responding device driver 510 and requesting device driver 520 are similar to requesting device driver 310 and responding device driver 320 of FIG. 3, respectively. Requesting device driver 510 includes requests 511 through 516 and 540, and responding device driver 520 includes requests 521 through 526 and 540. In the illustrative embodiment, requesting device driver 510 organizes requests in a tree data structure, while responding device driver 520 organizes requests sequentially.

Controller 530 is similar to controller 330 of FIG. 3 and is an operating system kernel that manages and tracks requests from requesting device driver 510 and responding device driver 520. Controller 530 facilitates communication of request 540 between requesting device driver 510 and responding device driver 520. After controller 530 processes request 540, request 540 is known and active in both requesting device driver 510 and responding device driver 520.

Request 540 is a request generated from requesting device driver 510. Request 540 is similar to device driver request 400 of FIG. 4 and is an instruction by requesting device driver 510 for responding device driver 520. In the illustrative embodiment, controller 530 associates a first operating system timestamp to request 540. The first operating system timestamp reflects the time that controller 530 receives request 540 and is recorded in the first operating system timestamp field of request 540. Simultaneously with the association of the operating system timestamp, controller 530 adds request 540 to the end of linked list 550. Linked list 550 is similar to the linked list in system-wide requests database 350 of FIG. 3. Linked list 550 is a system-wide list of active requests or requests being processed by data processing system 500. When controller 530 adds request 540 to linked list 550, controller 530 uses the operating system pointers to attach request 540 to linked list 550.

The illustrative embodiment is not limited to the illustrated example. For example, data processing system 500 can include more or fewer components. Additionally, requesting device driver 510 and responding device driver 520 can include a variety of different data structures. Furthermore, linked list 550 can include more or fewer requests in queue. Moreover, controller 530 is not limited to adding request 540 to the end of linked list 550, but can insert request 540 anywhere in linked list 550. Furthermore, the illustrative embodiments can be in any other type of data structure or database and are not limited to a queue data structure.

Figure 6:
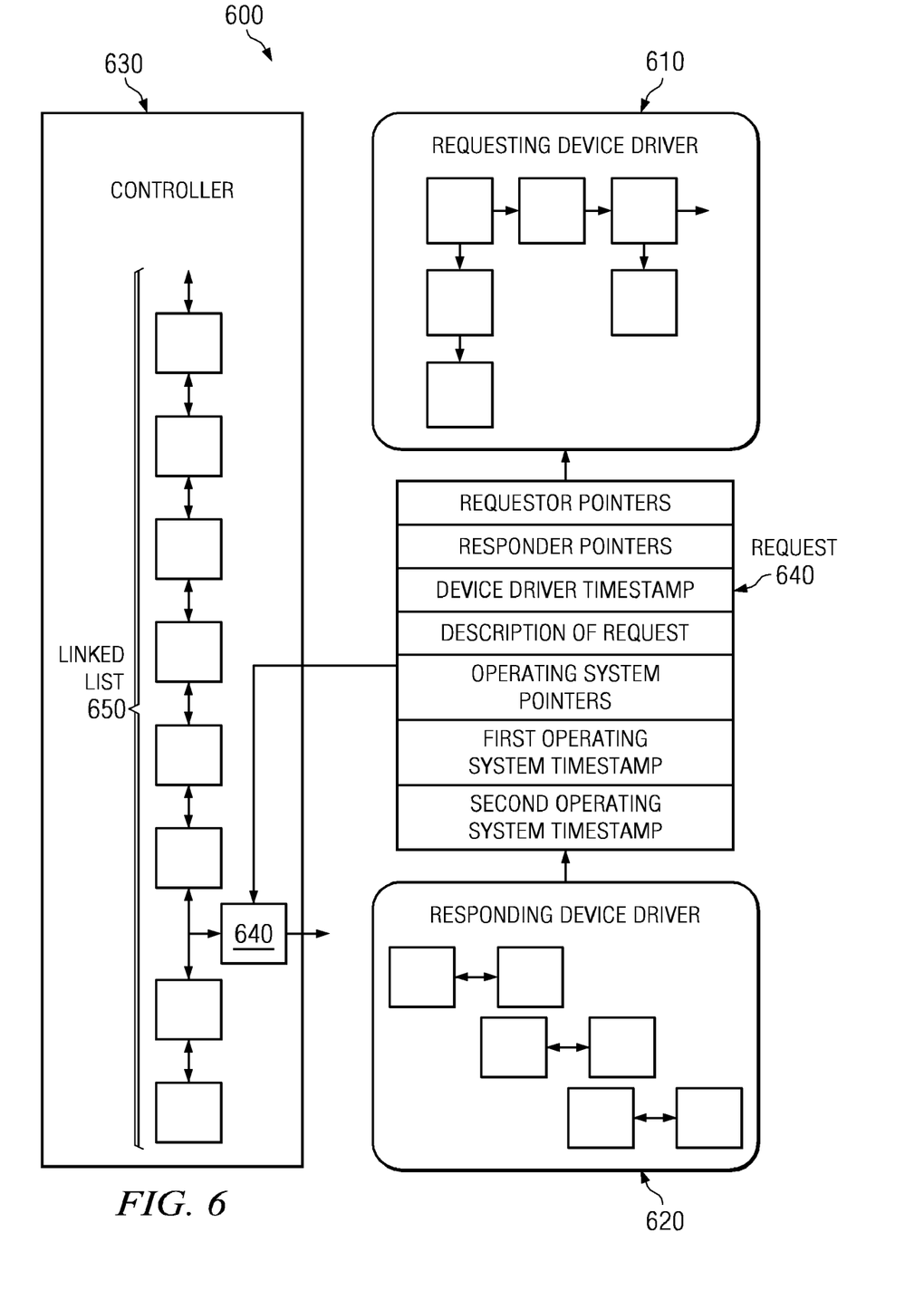
FIG. 6 illustrates the removal of a device driver request from a queue in an operating system, in accordance with an illustrative embodiment.

FIG. 6 illustrates the removal of a device driver request from a queue in an operating system, in accordance with an illustrative embodiment. Data processing system 600 is similar to data processing system 300 of FIG. 3 and data processing system 500 of FIG. 5. Data processing system 600 includes requesting device driver 610, responding device driver 620, controller 630, request 640, and linked list 650.

Requesting device driver 610 and responding device driver 620 are similar to requesting device driver 310 and responding device driver 320 of FIG. 3, respectively, and to responding device driver 510 and requesting device driver 520 of FIG. 5, respectively. In the illustrative embodiment, responding device driver 620 is responding to request 640, which is originally generated and sent by requesting device driver 610. Specifically, responding device driver 620 is communicating completion of request 640 to requesting device driver 610. Controller 630 is facilitating and managing the communication of request 640 between requesting device driver 610 and responding device driver 620.

As responding device driver 620 communicates the completion of request 640 to requesting device driver 610, controller 630 removes request 640 from linked list 650. In other words, controller 630 uses the operating system pointers in request 640 to identify where request 640 is attached or linked in linked list 650. After identifying request 640, controller 630 removes request 640 from linked list 650, and the operating system pointers for the requests before and after request 640 are then modified and linked together. Depending on implementation, controller 630 can then compare the first operating system timestamp in request 640 against the second operating system timestamp. Controller 630 can use the difference in time to monitor or analyze the duration of processing request 640 or store the information for use in a post-mortem trouble-shooting session or other application.

The illustrative embodiment is not limited to the illustrated example. For example, data processing system 600 can include more or fewer components. Additionally, requesting device driver 610 and responding device driver 620 can include a variety of different data structures. Furthermore, linked list 650 can include more or fewer requests in queue. Moreover, linked list 650 can be any other type of data structure or database.

Figure 7:
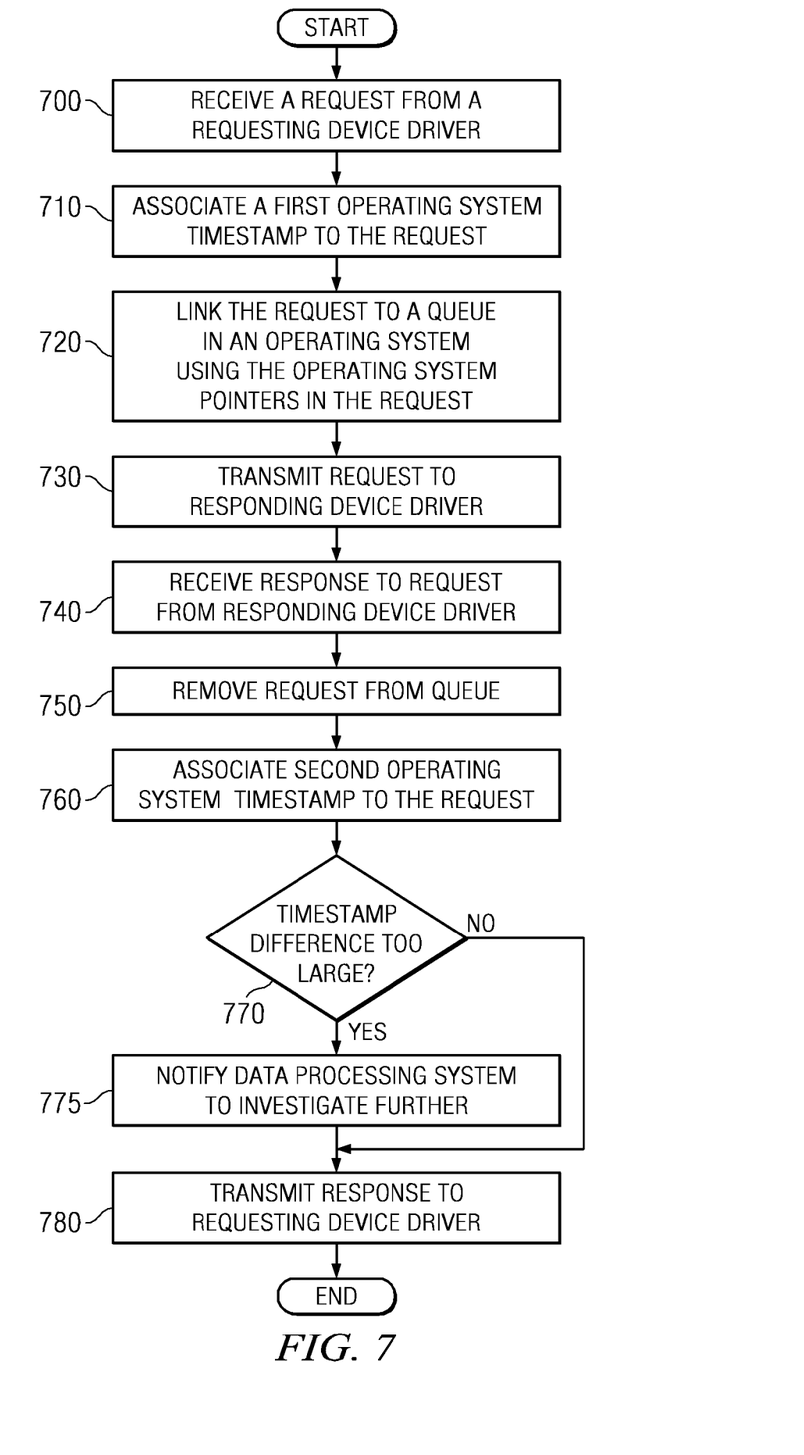
FIG. 7 is a flowchart illustrating the process for timing and tracking a device driver request, in accordance with an illustrative embodiment.

FIG. 7 is a flowchart illustrating the process for tracking a device driver request, in accordance with an illustrative embodiment. The process can be implemented in a controller, similar to controller 330 of FIG. 3, controller 530 of FIG. 5, or controller 630 of FIG. 6. The following process is only exemplary, and the order of the steps may be interchanged without deviating from the scope of the invention.

The process begins with the controller receiving a request from a requesting device driver (step 700). The controller then associates a first operating system timestamp to the request (step 710). The controller then links the request to a queue in an operating system using the operating system pointers in the request (step 720). The controller then transmits the request to a responding device driver (step 730). The controller then receives a response to the request from the responding device driver (step 740). The controller then removes the request from the queue (step 750) and associates a second operating system timestamp to the request (step 760). The controller then determines whether the time difference between the first operating system timestamp and the second operating system timestamp is too large (step 770). If the timestamp difference is too large ("yes" output to step 770), the controller notifies the data processing system to investigate further (step 775). Alternatively, the controller can notify the user or the administrator of the data processing system. The controller then transmits the response to the request to the requesting device driver (step 780), with the process terminating thereafter.

Returning to step 770, if the timestamp difference is not too large ("no" output to step 770), the controller transmits the response to the request to the requesting device driver (step 780). The process terminates thereafter.

Thus, the illustrative embodiments provide a computer implemented method, an apparatus, and a computer usable program product for tracking device driver requests in a data processing system. A controller receives a request from a device driver. The controller then associates a timestamp and at least one pointer to the request. To associate means to append or link a timestamp or at least one pointer to the request. The timestamp indicates a time the request is received by an operating system. In one embodiment, the operating system includes a kernel.

The controller then links the request from the requesting device driver in a queue in the operating system. The queue can be a linked list, an associative array, a hash chain, or a mesh network. The pointer attaches the request to the queue by identifying at least one neighboring request in the queue. The controller then deletes the request from the queue when the request is finished processing.

In an alternative embodiment, the timestamp can be a first operating system timestamp. The controller can associate a second operating system timestamp to the request. The second operating system timestamp indicates a time when the request finishes processing. The controller can then determine a time duration between the first operating system timestamp and the second operating system timestamp. The time duration is the difference in time between the first and second operating system timestamps. If the time duration exceeds a threshold, the controller can optionally notify the data processing system, the user of the data processing system, or the administrator of the data processing system to investigate further.

The illustrative embodiments provide a method for identifying and tracking specific requests using an operating system timestamp and an operating system pointer. The operating system timestamp provides a consistent time representation for the data during a post-mortem trouble-shooting session. The queue that the operating system pointer links the request to allows for tracking and managing of the requests, thereby allowing for future performance management analysis.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of tracking processing of device driver requests in a data processing system executing an operating system, the method comprising:
    first receiving, by the operating system, requests from multiple device drivers;
    responsive to receiving the requests, first generating corresponding first timestamps and storing the timestamps in a system-wide pending requests database along with indications identifying corresponding requests;
    second receiving, by the operating system, indications of completion of the requests;
    responsive to second receiving the indications of completions of the requests, second generating corresponding second timestamps;
    further responsive to second receiving the indications of completions of the requests, retrieving and removing the corresponding first timestamps and corresponding indications from the system-wide pending requests database, and comparing differences between the corresponding second timestamps and the corresponding first timestamps to a threshold value; and
    responsive to the difference between the corresponding second timestamps and the corresponding first timestamps being greater than the threshold value, generating notifications within the operating system that time periods required for completion of the corresponding requests have exceeded the threshold value.

2. The method of claim 1, wherein the first receiving receives a given request from a first device driver for communication to a second device driver, wherein the completion of the given request is the second device driver processing the request provided from the first device driver.

3. The method of claim 1, wherein the first generating generates the first timestamps and the second generating generate the second timestamps in a selectable time format, whereby a unified time format is provided by the operating system for evaluating processing device driver requests from any device driver in the data processing system.

4. The method of claim 3, further comprising selecting, in response to an indication received from an administrator of the operating system, a particular time format, and wherein the first generating and second generating generate timestamps having the particular time format.

5. The method of claim 1, wherein the indications are pointers to the corresponding requests in a memory of the data processing system stored in the system-wide pending requests database.

6. The method of claim 1, wherein the indications are copies of the requests in a memory of the data processing system stored in the system-wide pending requests database.

7. The method of claim 1, further comprising:
    receiving one of the generated notifications that a time period for completion of a request has exceeded the threshold value; and
    searching the system-wide pending requests database for long-running requests to determine a source of an error condition causing the long-running requests.

8. A data processing system including a processor for executing program instructions implementing an operating system, wherein the program instructions are stored in a memory coupled to the processor, the program instructions further comprising program instructions for:
    first receiving, by the operating system, requests from multiple device drivers;
    responsive to receiving the requests, first generating corresponding first timestamps and storing the timestamps in a system-wide pending requests database along with indications identifying corresponding requests;
    second receiving, by the operating system, indications of completion of the requests;
    responsive to second receiving the indications of completions of the requests, second generating corresponding second timestamps;
    further responsive to second receiving the indications of completions of the requests, retrieving and removing the corresponding first timestamps and corresponding indications from the system-wide pending requests database, and comparing differences between the corresponding second timestamps and the corresponding first timestamps to a threshold value; and
    responsive to the difference between the corresponding second timestamps and the corresponding first timestamps being greater than the threshold value, generating notifications within the operating system that time periods required for completion of the corresponding requests have exceeded the threshold value.

9. The data processing system of claim 8, wherein the program instructions for first receiving receive a given request from a first device driver for communication to a second device driver, wherein the completion of the given request is the second device driver processing the request provided from the first device driver.

10. The data processing system of claim 8, wherein the program instructions for first generating generate the first timestamps and the program instructions for second generating generate the second timestamps in a selectable time format, whereby a unified time format is provided by the operating system for evaluating processing device driver requests from any device driver in the data processing system.

11. The data processing system of claim 10, further comprising program instructions for selecting, in response to an indication received from an administrator of the operating system, a particular time format, and wherein the program instructions first generating and second generating generate timestamps in conformity with the particular time format.

12. The data processing system of claim 8, wherein the indications are pointers to the corresponding requests in a memory of the data processing system stored in the system-wide pending requests database.

13. The data processing system of claim 8, wherein the indications are copies of the requests in a memory of the data processing system stored in the system-wide pending requests database.

14. The data processing system of claim 8, wherein the program instructions further comprise program instructions for:
receiving one of the generated notifications that a time period for completion of a request has exceeded the threshold value; and
searching the system-wide pending requests database for long-running requests to determine a source of an error condition causing the long-running requests.

15. A computer program product comprising a computer-readable storage media storing program instructions implementing an operating system for execution by a processor in a data processing system, the program instructions further comprising program instructions for:
first receiving, by the operating system, requests from multiple device drivers;
responsive to receiving the requests, first generating corresponding first timestamps and storing the timestamps in a system-wide pending requests database along with indications identifying corresponding requests;
second receiving, by the operating system, indications of completion of the requests;
responsive to second receiving the indications of completions of the requests, second generating corresponding second timestamps;
further responsive to second receiving the indications of completions of the requests, retrieving and removing the corresponding first timestamps and corresponding indications from the system-wide pending requests database, and comparing differences between the corresponding second timestamps and the corresponding first timestamps to a threshold value; and
responsive to the difference between the corresponding second timestamps and the corresponding first timestamps being greater than the threshold value, generating notifications within the operating system that time periods required for completion of the corresponding requests have exceeded the threshold value.

16. The computer program product of claim 15, wherein the program instructions for first receiving receive a given request from a first device driver for communication to a second device driver, wherein the completion of the given request is the second device driver processing the request provided from the first device driver.

17. The computer program product of claim 15, wherein the program instructions for first generating generate the first timestamps and the program instructions for second generating generate the second timestamps in a selectable time format, whereby a unified time format is provided by the operating system for evaluating processing device driver requests from any device driver in the data processing system.

18. The computer program product of claim 17, further comprising program instructions for selecting, in response to an indication received from an administrator of the operating system, a particular time format, and wherein the program instructions first generating and second generating generate timestamps in conformity with the particular time format.

19. The computer program product of claim 15, wherein the indications are copies of the requests in a memory of the data processing system stored in the system-wide pending requests database.

20. The computer program product of claim 15, wherein the program instructions further comprise program instructions for:
receiving one of the generated notifications that a time period for completion of a request has exceeded the threshold value; and
searching the system-wide pending requests database for long-running requests to determine a source of an error condition causing the long-running requests.

* * * * *